(12) United States Patent
You et al.

(10) Patent No.: US 9,652,297 B2
(45) Date of Patent: May 16, 2017

(54) TECHNIQUES FOR DISTRIBUTED PROCESSING TASK PORTION ASSIGNMENT

(71) Applicant: Intel Corporation, Santa Clara, CA (US)

(72) Inventors: Liang You, Beijing (CN); Nan Qiao, Beijing (CN); Jun Jin, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 178 days.

(21) Appl. No.: 14/129,921

(22) PCT Filed: Sep. 19, 2013

(86) PCT No.: PCT/CN2013/083847
§ 371 (c)(1),
(2) Date: Apr. 30, 2014

(87) PCT Pub. No.: WO2015/039320
PCT Pub. Date: Mar. 26, 2015

(65) Prior Publication Data
US 2015/0082317 A1    Mar. 19, 2015

(51) Int. Cl.
*G06F 9/46* (2006.01)
*G06F 9/50* (2006.01)

(52) U.S. Cl.
CPC .......... *G06F 9/5094* (2013.01); *G06F 9/5066* (2013.01); *G06F 2209/5017* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| 6,804,632 B2 * | 10/2004 | Orenstien | G06F 1/206 |
| | | | 702/182 |
| 7,043,405 B2 * | 5/2006 | Orenstien | G06F 1/206 |
| | | | 702/184 |

(Continued)

OTHER PUBLICATIONS

Kumar et al. "Single-ISA Heterogeneous Multi-Core Architectures: The Potential for Processor Power Reduction", 2003 IEEE, 12 pages.*

(Continued)

*Primary Examiner* — Van Nguyen

(57) ABSTRACT

Various embodiments are generally directed to techniques for assigning portions of a task among individual cores of one or more processor components of each processing device of a distributed processing system. An apparatus to assign processor component cores to perform task portions includes a processor component; an interface to couple the processor component to a network to receive data that indicates available cores of base and subsystem processor components of processing devices of a distributed processing system, the subsystem processor components made accessible on the network through the base processor components; and a core selection component for execution by the processor component to select cores from among the available cores to execute instances of task portion routines of a task based on a selected balance point between compute time and power consumption needed to execute the instances of the task portion routines. Other embodiments are described and claimed.

20 Claims, 11 Drawing Sheets

(56) References Cited

U.S. PATENT DOCUMENTS

| | | | | |
|---|---|---|---|---|
| 7,093,147 B2* | 8/2006 | Farkas | G06F 1/3203 | |
| | | | 713/320 | |
| 7,412,353 B2* | 8/2008 | Borkar | G06F 1/3203 | |
| | | | 702/186 | |
| 7,490,254 B2* | 2/2009 | Clark | G06F 1/3203 | |
| | | | 713/320 | |
| 7,774,590 B2* | 8/2010 | Borkar | G06F 1/32 | |
| | | | 713/1 | |
| 7,788,670 B2* | 8/2010 | Bodas | G06F 9/5044 | |
| | | | 712/203 | |
| 8,219,994 B2* | 7/2012 | Topaloglu | G06F 9/5094 | |
| | | | 712/229 | |
| 8,230,426 B2* | 7/2012 | Powers | G06F 9/505 | |
| | | | 712/28 | |
| 8,490,103 B1 | 7/2013 | Belady et al. | | |
| 8,516,493 B2* | 8/2013 | Hande | G06F 9/5022 | |
| | | | 709/223 | |
| 9,104,411 B2* | 8/2015 | Thomson | G06F 1/3203 | |
| 2003/0217090 A1 | 11/2003 | Chauvel et al. | | |
| 2006/0265535 A1 | 11/2006 | Ohtsuka | | |
| 2011/0219382 A1 | 9/2011 | Hou | | |
| 2012/0036398 A1* | 2/2012 | Moyer | G06F 9/505 | |
| | | | 714/48 | |
| 2013/0036423 A1 | 2/2013 | McCready et al. | | |

OTHER PUBLICATIONS

Kumar et al. "A Multi-Core Approach to Addressing the Energy-Complexity Problem in Microprocessors", 2003, pp. 1-8.*

Feljan et al. "Towards a model-based approach for allocating tasks to multicore processors", 2012 IEEE pp. 117-124.*

International Search Report and Written opinion received for PCT Patent Application No. PCT/CN2013/083847, mailed Jun. 24, 2014, 12 pages.

* cited by examiner

2100

TECHNIQUES FOR DISTRIBUTED PROCESSING TASK PORTION ASSIGNMENT

TECHNICAL FIELD

Embodiments described herein generally relate to distribution of portions of a task among cores of processor components of processing devices of a distributed processing system.

BACKGROUND

It has become commonplace to use so-called "server farms" of numerous processing devices coupled by one or more networks to perform a task by assigning multiple portions of that task among multiple ones of the processing devices to perform those portions in parallel. However, such commonplace practices entail a granularity of assignment of task portions that is only per processing device. Thus, each task portion is assigned to an entire computing device, and each processing device is entirely devoted to only the one task portion that is assigned to it.

Achieving a finer degree of granularity in assigning task portions to individual processor components and/or individual cores of processor components within a processing device has been possible by incorporating a scheduling routine into a routine that implements the logic of a task portion that is assigned to a processing device. However, this requirement of including a scheduling routine within a task portion to achieve such granularity requires some amount of knowledge of the particular configuration of processor component(s) of the processing device to enable effective assignment of subparts, adding an undesired burden for those writing the code for each task. In particular, in processing devices having a base processor component accompanied by multiple co-processor components, the scheduling routine must often be compiled specifically to be executed by the base processor component, and the portions of the routine implementing the logic of the subparts of a task portion must be compiled specifically for the co-processor components.

Further, the fact of each processing device being devoted entirely to only one task portion is often wasteful of available processing resources within at least some of the processing devices, as it is seldom the case that each task portion is able to be tailored to make effective use of all of the cores within each the processing devices. This inevitably results in the use of more of the processing devices to perform each task, thereby depriving other tasks of the opportunity to make use of those processing devices. Further, such inefficient use of processing and/or other resources of the processing devices ultimately results in a considerable waste of electric power.

DETAILED DESCRIPTION

Figure 1:
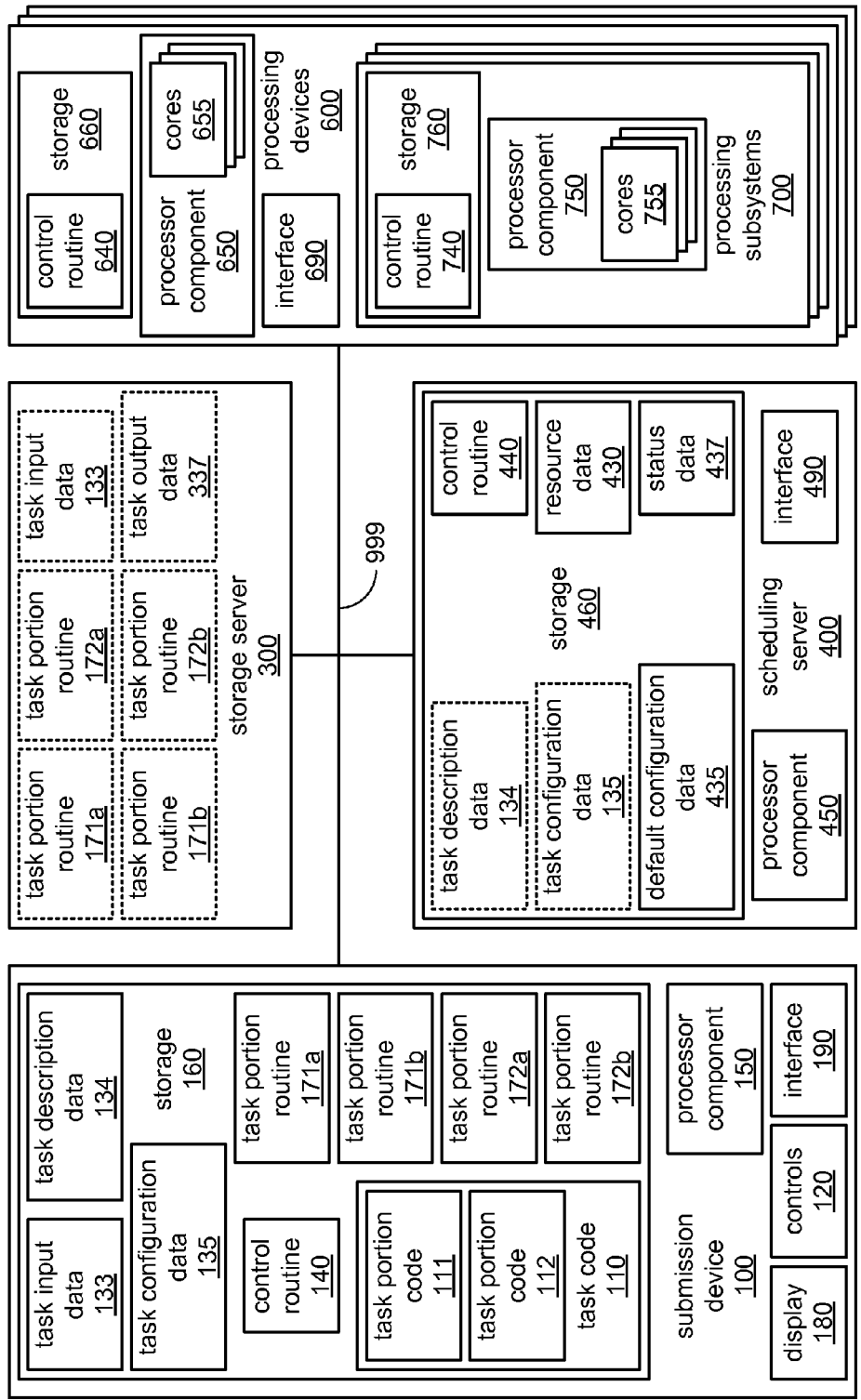
FIG. 1 illustrates an embodiment of a distributed processing system.

Various embodiments are generally directed to techniques for assigning portions of a task among individual cores of one or more processor components of each processing device of a distributed processing system. More specifically, task portions of a task are distributed among cores of both base processor components and subsystem processor components of processing devices of a distributed processing system. In support of such distribution, task portion code for each task portion of a task is compiled using multiple compilers to create versions of compiled task portion routines executable by cores of each type of processor component present in each of the processing devices. The multiple versions of each of the task portion routines are stored in a storage server, along with any task input data that may be required to perform the task, where they are able to be retrieved by one or more of the processing devices. A task description data conveying various parameters of the task is provided to a scheduling server to enable the scheduling server to select and assign cores of processor components of one or more of the processing devices to perform the task portions of the task.

The scheduling server also receives resource data from each of the processing devices specifying the processing and other resources of each processor component of each processing device of the distributed processing system. Such resource data may include indications of quantity and/or types of cores of each processor component, size of caches, speeds of cores, rates of power consumption of cores, size of storages available to processor components, etc.

The scheduling server may be configured by one or both of a default configuration data and a configuration data associated with the task to select cores to which to assign task portions based on a chosen tradeoff between reducing the time to perform the task versus reducing the consumption of electric power to perform the task. By way of example, the scheduling server may, whenever possible, assign processor component cores of processing devices that consume less power in order to reduce overall consumption of electric power in the performance of the task, and may do so at the expense of speed in performing of the task. By way of another example, the scheduling server may, whenever possible, assign faster processor component cores (e.g., processor component cores operating a higher clock rates or having access to larger caches) to reduce the overall time required to perform the task. Alternatively or additionally, the scheduling server may, whenever possible, assign processor component cores of the same processor component and/or of processor components of the same processing device to reduce the time to perform the task by reducing instances of the need for inter-process communication to be performed over a network between processing devices.

The scheduling server transmits indication of assignments of the task portions to the ones of the processing devices having one or more of the processor component cores to which task portions are assigned. Such indications may include a pointer to where task portion routines and any input data may be retrieved (e.g., from the storage server at which they are stored). Upon receipt of such indications, the processor component cores to which these task portions have been assigned employ such pointers to retrieve corresponding ones of the versions of the task portion routines, along with whatever input data may be required, and then execute their respective ones of the task portion routines.

During execution of the task portion routines, the processor component cores assigned a task portion routine each transmit status data indicating one or more aspects of their progress in performing their respective task portions of the task to the scheduling server. This may or may not be done in response to status queries from the scheduling server. The scheduling server may then respond to status queries of progress in performing the task with an indication of the overall progress made in performing the task up to that time.

Also during execution of the task routines, and depending on the nature of the task, the processor component cores may transmit portions of output data from their performances of their assigned task portions to the storage server from which the task portion routines and/or input data were earlier retrieved. The storage server may assemble or format the portions of such output data into a single output data or data set that can be retrieved for review by other computing devices when performance of the task is complete.

Within at least some of the processing devices may be a base processor component and one or more subsystem processor components. Each of the subsystem processor components may be coupled to a storage separate from a storage coupled to the base processor component, thereby forming one or more substantially independent processing subsystems. In some embodiments, the base processor component and the one or more subsystem processor components may be of different types for which code may need to be compiled with different compilers. The base processor component may be more directly coupled to an interface of the processing device to a network, and may cooperate with each of the subsystem processor components to provide each of the subsystem processor component with a separately addressable "virtual presence" on the network.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a distributed processing system 1000 incorporating one or more of a submission device 100, a storage server 300, a scheduling server 400 and multiple processing devices 600. Each of these computing devices 100, 300, 400 and 600 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, subsets of these computing devices 100, 300, 400 and 600 exchange signals associated with the distributed performance of a task via a network 999. However, one or more of these computing devices may exchange other data entirely unrelated to distributed processing with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the submission device 100 incorporates one or more of a processor component 150, a storage 160, controls 120, a display 180 and an interface 190 to couple the submission device 100 to the network 999. The storage 160 stores one or more of a control routine 140, task input data 133, task description data 134, task configuration data 135, a task code 110, and task portion routines 171*a-b* and 172*a-b*. The task code 110 incorporates task portion codes 111 and 112. The control routine 140 incorporates a sequence of instructions operative on the processor component 150 in its role as a main processor component of the submission device 100 to implement logic to perform various functions. As will be explained in greater detail, each of the task portion routines 171*a-b* and 172*a-b* incorporates a sequence of instructions operative on different processor components of the processing devices 600 to implement logic to perform various functions of a common task.

In executing the control routine 140, the processor component 150 may compile the task portion code 111 with separate compilers to generate the task portion routine 171*a* for execution by one type of processor component core, and the task portion routine 171*b* for execution by another type of processor component core. In other words, each of the task portion routines 171*a* and 171*b* is a compiled version of task portion code 111, and each implements the same logic, but each is meant to be executed by a different processor core. In executing the control routine 140, the processor component 150 may similarly compile the task portion code 112 with separate compilers to generate the task portion routine 172*a* for execution by the same type of processor component core as the task portion routine 171*a*, and the task portion routine 172*b* for execution by the same type of processor component core as the task portion routine 171*b*.

It should be noted that although the task code 110 is depicted as incorporating only two distinct task portions codes 111 and 112, this is done for sake of simplicity of illustration and discussion herein. Other embodiments are possible in which the task code 110 incorporates only a single task portion code or incorporates multiple task portion codes of a quantity other than two. More generally, it should be noted that the quantity of different task portions into which a task may be divided depends on the nature of the task. Some tasks may be performed in parallel by dividing the task into multiple instances of only a single task portion that can be performed in parallel. In a corresponding embodiment, the task code 110 may incorporate only the task portion 111, and there may be multiple instances of the compiled task portion routine 171*a* and/or 171*b* executed by multiple processor component cores in parallel. Alternatively, other tasks may be performed in parallel by dividing the task in to multiple different task portions such that the task code 110 correspondingly incorporates multiple different task portion codes. There may be only one instance of one or more of those different task portions and/or there may be multiple instances of one or more others of those different task portions.

In further executing the control routine 140, the processor component 150 may operate the interface 190 to transmit the task portion routines 171*a-b* and 172*a-b* to the storage server 300 via the network 999. In embodiments in which performance of the task associated with the task code 110 requires data as an input, the processor component 150 may also transmit the task input data 133 incorporating such data to the storage server 300. The processor component 150 further operates the interface 190 to transmit at least the task description data 134 to the scheduling server 400 via the network 999. The task description data 134 provides various parameters of the task associated with the task code 110, which may include one or more of the quantity of different task portions, the quantity of instances of each of the different task portions to be performed in parallel, the types of processor component cores for which each different task portion has been compiled, indications of where the task portion routines and/or any input data (e.g., the task input data 133) may be found, and indications of where any output data is to be stored. In embodiments in which the manner in which processor component cores are selected for assignment of task portions may be specified for each task, the processor component 150 may also transmit the task configuration data 135 to the scheduling server 400 to do so. In transmitting the task portion routines 171*a-b* and 172*a-b*, and/or the input data 133 to the storage server 300, and in transmitting the task description data 134 and/or the task configuration data 135 to the scheduling server 400, the processor component 150 effectively "submits" the task associated with the task code 110 to the distributed processing system 1000 for execution.

In various embodiments, the scheduling server 400 incorporates one or more of a processor component 450, a storage 460 and an interface 490 to couple the scheduling server 400 to the network 999. The storage 460 stores one or more of a control routine 440, task resource data 430, default configuration data 435 and status data 437, as well as the task description data 134 and the task configuration data 135 received from the submission device 100. The control routine 440 incorporates a sequence of instructions operative on the processor component 450 in its role as a main processor component of the scheduling server 400 to implement logic to perform various functions.

In executing the control routine 440, the processor component 450 may prepare the distributed processing system 1000 for use by operating the interface 490 to receive pieces of resource data via the network 999 from each of the processing devices 600 indicating processing and other resources that exist within each. The pieces of resource data may be received individually from each processor component within each of the processing devices 600 and indicate the processing and other resources associated with each processor component. Alternatively, the pieces of resource data may be received one apiece from each of the processing devices 600, and indicate the processing and other resources associated with all of the processor components within each of the processing devices 600. The processor component 450 may have prompted the provision of these pieces of resource data by the processing devices 600 by transmitting queries of what resources are present to each of the processing devices 600. Such prompting may be done periodically by the processor component 450 (e.g., a regular intervals), may be done in response to the initialization (e.g., resetting or "powering on") of the scheduling server 400, or may be done in response to receiving an indication of a change having been made to one or more of the processing systems 600 and/or to the network 999 by which the scheduling server 400 is coupled to the processing systems 600. The processor component 450 may aggregate and store the pieces of received resource data as the resource data 430.

In also executing the control routine 440, the processor component 450 may operate the interface 490 to receive from the submission device 100 and store the task description data 134 and/or the task configuration data 135. As previously discussed, the task description data 134 provides indications of various parameters of the task associated with the task code 110, thereby effectively providing the scheduling server 400 with indications of what resources are needed of the distributed processing system 1000 to perform the task. The control routine 440 assigns the quantity of processor component cores and other resources of at least some of the processing devices 600 of the distributed processing system 1000 as needed to meet the parameters indicated in the task description data 134.

The task configuration data 135, if provided by the submission device 100, may indicate the manner in which at least processor component cores are to be selected for assignment to perform task portions of the task. Provision of the task configuration data 135 to the scheduling server 400 may be optional, and may be provided to override whatever indication is provided in the default configuration data 435 of a manner in which at least processor component cores are to be selected for assignment. As will be explained in greater detail, the manner of selection that is employed by the processor component 440 may represent a trade-off between selection to reduce the time to perform the task and selection to reduce electric power consumption in performing the task.

Regardless of the manner in which processor component cores are selected, the processor component 450 may operate the interface 490 to transmit to one or more processor components indications of which of their cores have been selected for assignment to perform task portions of the task. These indications may incorporate a subset of what is conveyed in the task description data 134, including and not limited to, indications of where the appropriate one of the task portion routines 171a-b and 172a-b may be found, where the input data 133 (if needed) may be found, and where any output data is to be stored. More simply, the processor component 450 provides each of the selected processor component cores an indication of what task portion it is to perform, what portion of input data (if there is any) to use as an input, and where to direct any output data.

In various embodiments, each of the processing devices 600 incorporates one or more of a processor component 650, a storage 660, an interface 690 providing a coupling to the network 999, and one or more processing subsystems 700. The processor component 650 incorporates one or more cores 655 in which the processing functions of the processor component 650 are performed. The storage 660 stores at least a control routine 640. Each of the processing subsystems 700 incorporates one or both of a processor component 750 and a storage 760. The processor component 750 incorporates one or more cores 755 in which the processing functions of the processor component 750 are performed. The storage 760 stores at least a control routine 740.

Figure 2A:
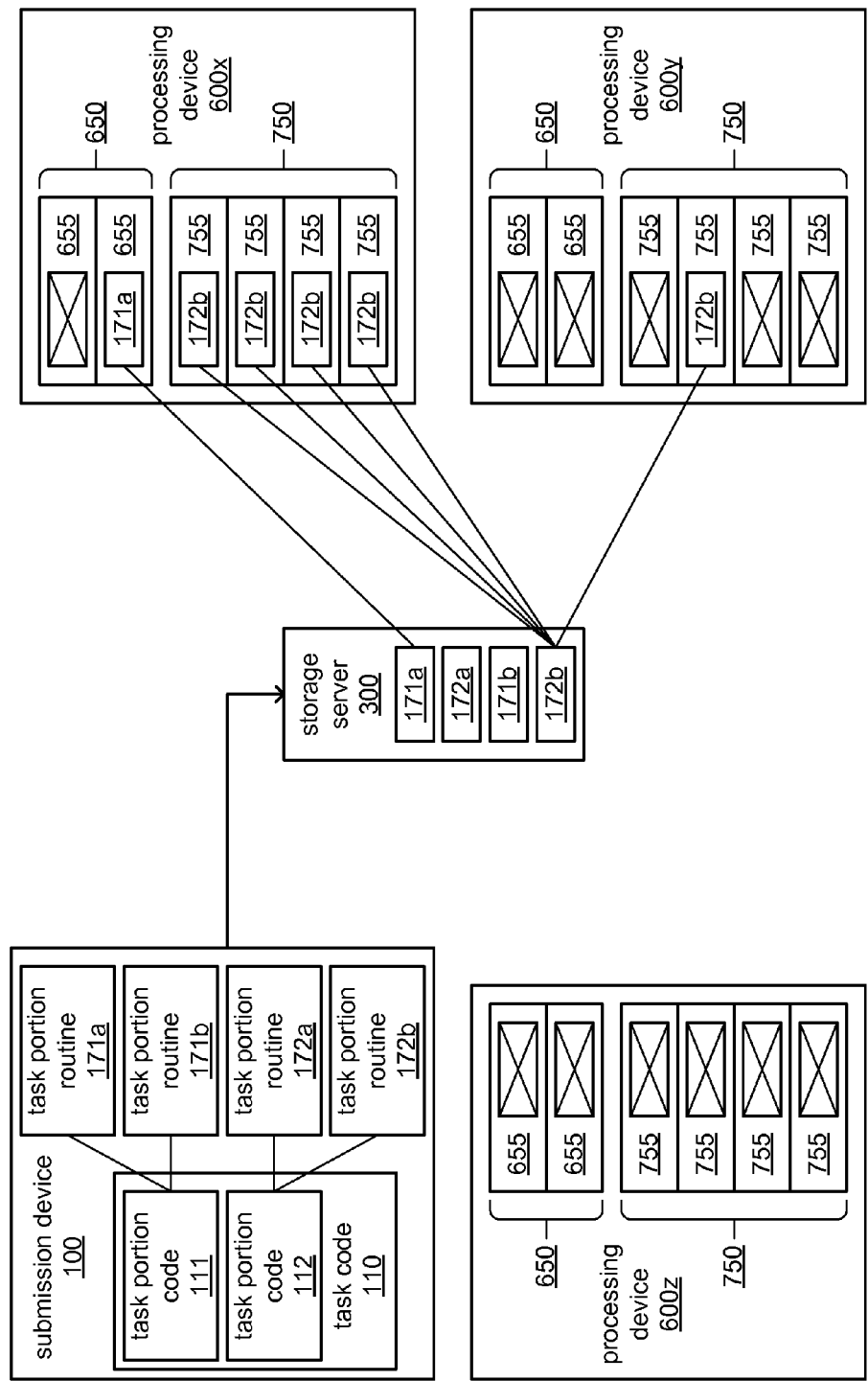
FIGS. 2A and 2B each illustrate an embodiment of a distributed processing system.
Figure 2B:
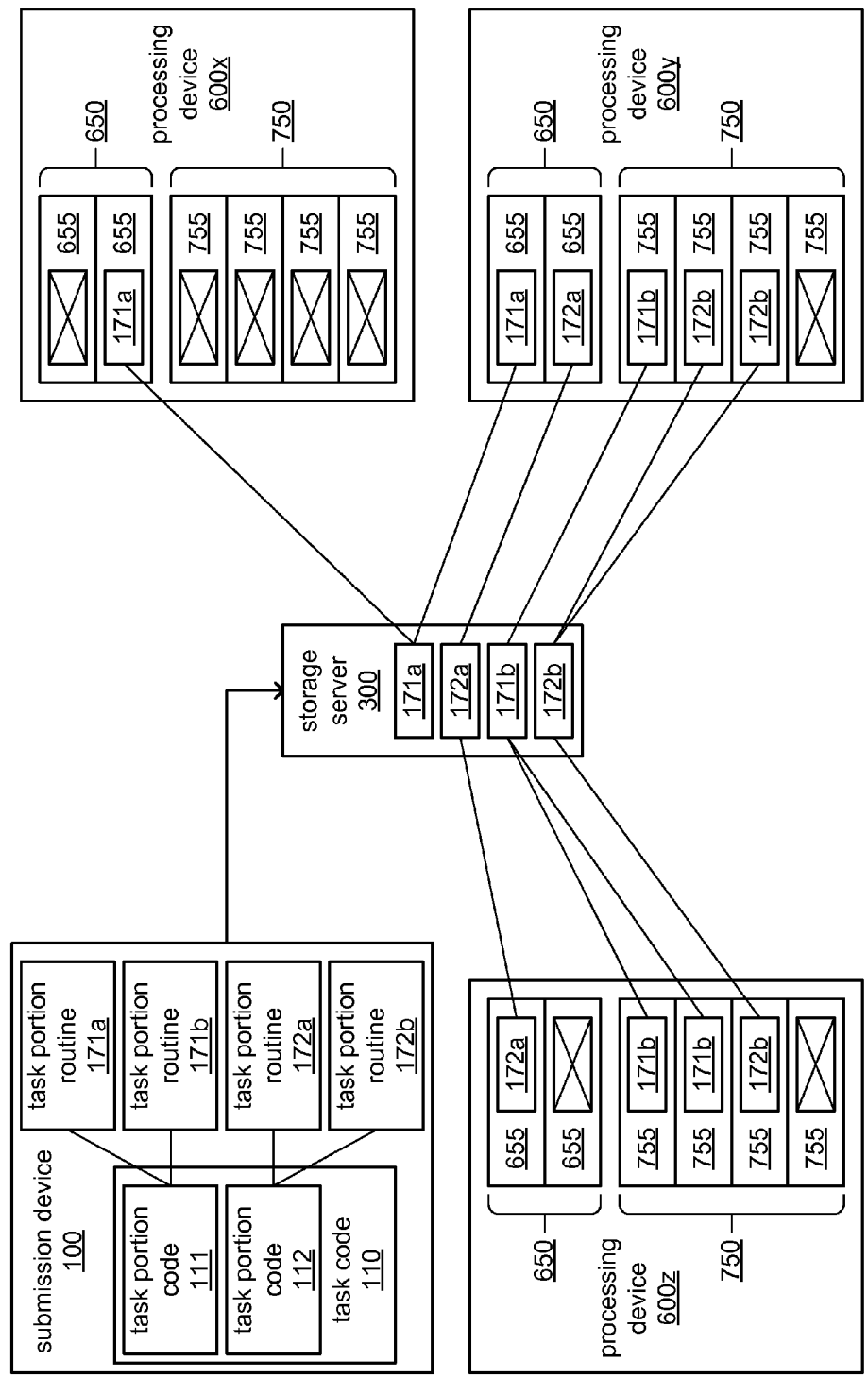

FIGS. 2A and 2B depict examples of operation of an embodiment of the distributed processing system 1000. This particular depicted embodiment incorporates three instances of the processing device 600, namely processing devices 600x, 600y and 600z. As depicted, each of the processing devices 600x-z incorporate one each of the processor components 650 and 750, with the processor component 650 incorporating two cores 655 and the processor component 750 incorporating four cores 755. For sake of the discussion of these examples, it is to be assumed that the cores 655 and 755 of the processing device 600x operate at a substantially higher clock frequency and consume electric power at a substantially higher rate than the cores 655 and 755 of the processing devices 600y-z. It is also to be assumed that the task portion routines 171a and 172a are operative on the cores 655 of the processor components 650, and that the task portion routines 171b and 172b are operative on the cores 755 of the processor components 750.

It should be noted that not all of the cores 655 and/or 755 of the processing devices 600x-z may be available as the processor component 450 is selecting ones of the cores 655 and/or 755 for assignment to perform task portions of a task. One or more of the cores 655 and/or 755 may already be engaged in performing tasking portion(s) of one or more other tasks.

In FIG. 2A, the distributed processing system 1000 performs task portions of a version of the task associated with the task code 110 in which only one instance of the task portion associated with the task portion code 111 is performed and in which multiple instances of the task portion associated with the task portion code 112 are performed. Further, the default configuration data 435 and/or the task configuration data 135 provides an indication that available resources of the distributed processing system 1000 are to be allocated in a manner causing the task to be performed as quickly as possible, and at the expense of efforts to reduce consumption of power, if necessary. In response, the processor component 450 selects ones of the processor component cores 655 and 755 among the processing devices 600x-z for assignment to task portions in a manner favoring reducing time required to perform the task in any trade-off between reducing time and reducing power consumption.

Thus, the processor component 450 may evaluate which of the processor components 650 and 750 will perform a given task portion faster than others, and attempt to assign ones of the task portion routines 171a-b and/or 172a-b to whatever ones of the cores 655 and 755 will bring about faster performance. Alternatively, indications of which ones of the cores 655 and 755 are capable of performing which task portions in a lesser amount of time may be conveyed to the scheduling server 400 along with or as part of the description data 134 and/or the task configuration data 135. Assuming that the processor component 450 determines that one of the cores 655 would be faster at performing the single needed instance of the task portion associated with the task portion code 111, the processor component 450 selects a single one of the cores 655 to execute the one needed instance of the task portion routine 171a compiled from the task portion code 111. Also, assuming that the processor component 450 determines that the cores 755 would be faster at performing the multiple instances of the task portion associated with the task portion code 112, the processor component 450 selects ones of the cores 755 to execute the needed instances of the task portion routine 172b compiled from the task portion code 112.

In selecting ones of the cores 655 and 755 in a manner reducing time required to perform the task versus reducing power consumption, the processor component 450 may alternatively or additionally select cores 655 and/or 755 of ones of processing devices 600x-z in which larger quantities of the cores 655 and/or 755 are available to limit the quantity of processing devices used. Limiting the quantity of processing devices used accordingly limits the amount of inter-process communications that must occur between processing devices over the network 999 to coordinate execution of task portion routines between ones of the cores 655 and/or 755. Stated differently, with more of the cores 655 and/or 755 selected within a lesser quantity of processing devices, more of the inter-process communications will occur across one or more buses within those processing devices, which are typically substantially faster than communications occurring across a network. This is achieving a reduction in time to perform the task by improving the degree of locality of the processor cores 655 and/or 755 assigned to perform portions of the task so that more inter-process communications occurs between ones of the cores 655 and/or 755 that are physically "local" to each other (e.g., disposed within the same processing device).

Thus, as depicted in FIG. 2A, the majority of the processor cores 655 and 755 selected to perform the task associated with this version of the task code 110 are within the single processing device 600x. As a result, the majority of the cores 655 and 755 selected to perform task portions of this task are the ones operating at the faster clock frequency, and are local to each other such that the majority of inter-process communications need not be conveyed via the network 999.

In FIG. 2B, the distributed processing system 1000 performs task portions of a version of the task associated with the task code 110 in which multiple instances of the task portions associated with both the task portion codes 111 and 112 are performed. Further, the default configuration data 435 and/or the task configuration data 135 provides an indication that available resources of the distributed processing system 1000 are to be allocated in a manner that minimizes the consumption of electric power, and at the expense of efforts to reduce the time required to perform the task, if necessary. In response, the processor component 450 selects ones of the processor component cores 655 and 755 among the processing devices 600x-z for assignment to task portions in a manner favoring reducing power consumption to perform the task in any trade-off between reducing time and reducing power consumption.

Thus, the processor component 450 may evaluate which of the processor components 650 and 750 will consume less electric power than others to perform a given task portion, and attempt to assign ones of the task portion routines 171*a-b* and/or 172*a-b* to whatever ones of the cores 655 and 755 will consume less electric power. Alternatively, indications of which ones of the cores 655 and 755 are capable of performing which task portions with a lesser power consumption may be conveyed to the scheduling server 400 along with or as part of the description data 134 and/or the task configuration data 135. Assuming that the processor component 450 determines that the cores 655 and 755 of the processing devices 600*y* and 600*z* would consume less power in performing the instances of the task portions associated with the task portion codes 111 and 112, the processor component 450 selects as many of the cores 655 and 755 of the processing device 600*y-z* as are available. Thus, as depicted, a mixture of the cores 655 and 755, mostly of the processing devices 600*y-z*, are selected to perform the tasks portions associated with each of the task portion codes 111 and 112. Thus, unlike the example of FIG. 2A, each of the task portion routines 171*a-b* and 172*a-b* is executed by at least one corresponding one of the cores 655 and 755.

In selecting ones of the cores 655 and 755 in a manner to reduce electric power consumption in performing the task versus reducing the time required, the processor component 450 may alternatively or additionally select cores 655 and/or 755 of ones of processing devices 600*x-z* in a manner that entirely ignores locality among the selected cores. Thus, the processor component may select ones of the cores 655 and 755 that are available across more or all of the processing devices 600*x-z*, despite the fact that this will increase the amount of inter-process communications that must occur across the network 999, rather than across likely faster internal buses within each of the processing devices 600*x-z*. Thus, as depicted in FIG. 2B, the processor cores 655 and 755 selected to perform the task associated with this version of the task code 110 are spread across all of the processing devices 600*x-z*, though preference is given to selecting ones of the cores 655 and 755 of the processing devices 600*y-z*, since they consume less electric power than those of the processing device 600*x*.

It should be noted that despite the specific depiction of a quantity of three processing devices, other embodiments may have more or fewer processing devices. It should also be noted that despite the specific depiction of a single one of each of the processor components 650 and 750, other embodiments may have more of one or both of these processor components. Further, other embodiments may incorporate only one type of processor component or may incorporate a quantity of different types of processor components greater than two. It should further be noted that despite the specific depiction of two cores 655 within the processor component 650 and four cores 755 within the processor component 750, other embodiments may have differing quantities of cores within each processor component. It should yet further be noted that despite the specific depiction of each of the processing devices 600*x-z* being of a substantially similar configuration of processor components and cores, other embodiments may incorporate processing devices of substantially dissimilar configurations.

Returning to the processing devices 600 in FIG. 1, within each of processing devices 600, the control routine 640 incorporates a sequence of instructions operative on the processor component 650 in its role as a base processor component of that processing device 600 to implement logic to perform various functions. Similarly, within each of the processing subsystems 700, the control routine 740 incorporates a sequence of instructions operative on the processor component 750 in its role as a subsystem processor component of that processing subsystem 700 to implement logic to perform various functions.

In executing the control routine 640, the processor component 650 may assist in preparing the distributed processing system 1000 for use by operating the interface 690 to transmit resource data via the network 999 to the scheduling server 400 indicating processing and other resources that within one of the processing devices 600. In some embodiments, a single piece of resource data may convey information concerning resources associated with all processor components 650 and/or 750 within one of the processing devices 600. In such embodiments, the processor components 650 and 750, in executing the control routines 640 and 740, respectively, may cooperate to generate such resource data. In other embodiments, separate pieces of resource data that each convey information concerning resources associated with a separate one of the processor components 650 and 750 may be separately transmitted to the scheduling server 400. In such embodiments, the processor 650 may be caused by its execution of the control routine 640 to receive a piece of such data from a processor component 750, and may operate the interface 690 to relay it to the scheduling server 400. As previously discussed, the provision of resource data to the scheduling server 400 may be in response to queries received from the scheduling server 400 for such data.

In further executing the control routine 640, the processor component 650 may operate the interface 690 to receive indications of task portions assigned to one or more of the cores 655 and/or 755 from the scheduling server 400 via the network 999. Where indications of task portions assigned to one or more of the cores 755 are received, the processor components 650 and 750, in executing the control routines 640 and 740, respectively, may cooperate to relay those indications from the processor component 650 to the processor component 750.

In still further executing the control routine 640, the processor component 650 may operate the interface 690 to transmit status data via the network 999 to the scheduling server 400 indicating current status of one or more of the cores 655 and/or 755 in executing a task portion routine to perform a task portion assigned to them. Where status data of the status of execution of a task portion routine by one or more of the cores 755 is to be transmitted to the scheduling server 400, the processor components 650 and 750, in executing the control routines 640 and 740, respectively, may cooperate to relay such status data from the processor component 750 to the processor component 650 for transmission.

As will be explained in greater detail, in various embodiments, the processor component 650 serves as a base processor component in each of the processing devices 600, and the processor components 750 serve as subsystem processor components therein. Indeed, the processing subsystems 700 into which each of the processor components 750 may be add-in circuitboards able to be selectively installable into or removable from each of the processing devices 600 to selectively augment the processor components 650 with one or more of the processor components 750. As a result, the processor component 650 may have more direct access to the interface 690 such that the processor component 650 is caused by execution of the control routine 640 to assist in providing each of the processor components 750 access to the network 999. In so doing, the processor component 650 may effectively provide each of the processor components 750 a "virtual presence" by which each of the processor components 750 is uniquely addressable on the network 999. Thus, conveyance of resource data, input data, task portion routines, status data and/or output data between any of the processor components 750 and the scheduling server 400 may be through the processor component 650.

Returning to the scheduling server 400 in FIG. 1, in executing the control routine 440, the processor component 450 may operate the interface 490 to receive pieces of status data via the network 999 from each of the processing devices 600 indicating current status of execution of task portion routines by one or more of the cores 655 and/or 755. The pieces of status data may be received individually from each processor component 650 and/or 750 within each of the processing devices 600 and indicate the status of execution of each task routine by all cores of a processing component. Alternatively, the pieces of resource data may be received individually from each of the processor component cores 655 and/or 755 and indicate the status of execution of a task routine by that one of the processor component cores 655 and/or 755. The processor component 450 may have prompted the provision of these pieces of status data by transmitting queries of the current status of execution of each task portion routine. Such prompting may be done periodically by the processor component 450 (e.g., a regular intervals), or may be done in response to receiving queries for the status of performance of a task via the network 999.

In further executing the control routine 440, the processor component 450 may aggregate and store the pieces of received status data as the status data 437. Still further, the processor component 450 may operate the interface 490 to monitor the network 999 for a query from the submission device 100 of current status of execution of the task associated with the task code 110. The processor component 450 may respond to such a query by operating the interface 490 to transmit at least a portion of the status data 437 to the submission device 100 indicative of the current status of performance of the task.

Returning to the submission device 100 in FIG. 1, in executing the control routine 140, the processor component 150 may operate the display 180 and the controls 120 to provide a user interface (UI) to an operator of the submission device 100. The processor component 150 may monitor the controls 120 for an indication of operation of the controls 120 to request current status of performance of the task associated with the task code 110, and may operate the interface 190 to transmit a query to the scheduling device 400 for such status in response. The processor component 150 may also operate interface 190 to receive an indication of such current status, and may operate the display 180 to visually present an indication of such status to the operator.

In various embodiments, each of the processor components 150, 450, 650 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 460, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 490 and 690 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3:
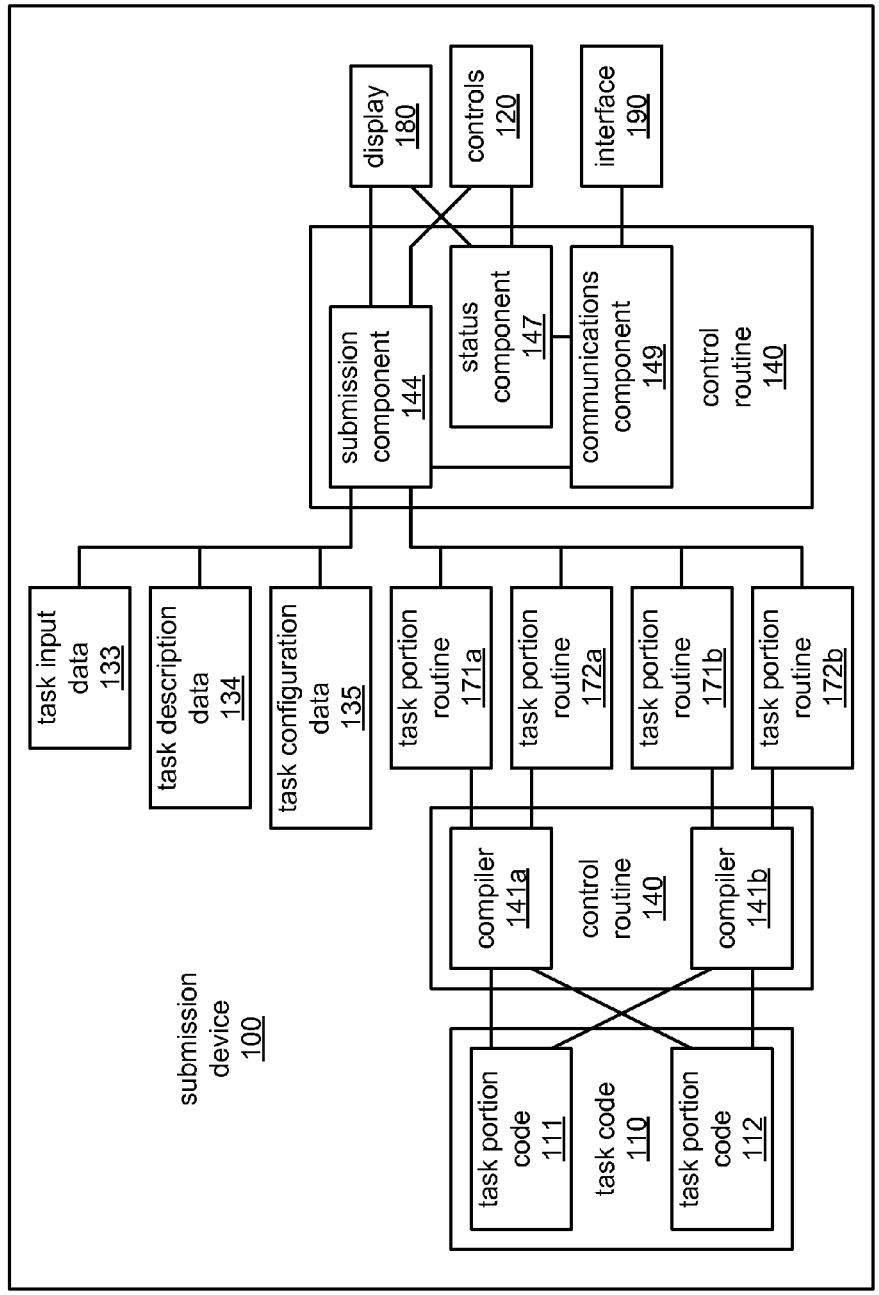
FIGS. 3-6 each illustrate a portion of an embodiment of a distributed processing system.
Figure 4:
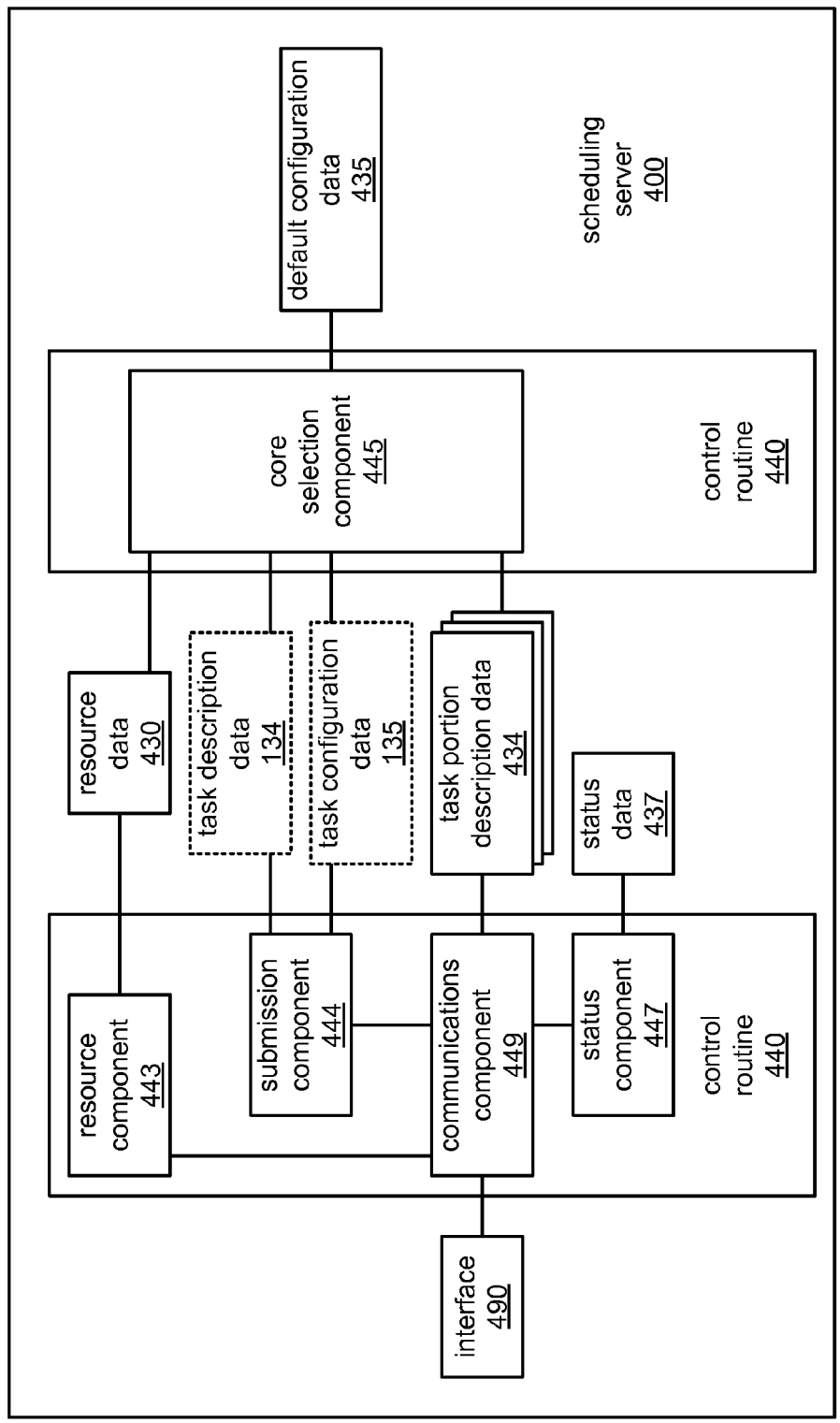
Figure 5:
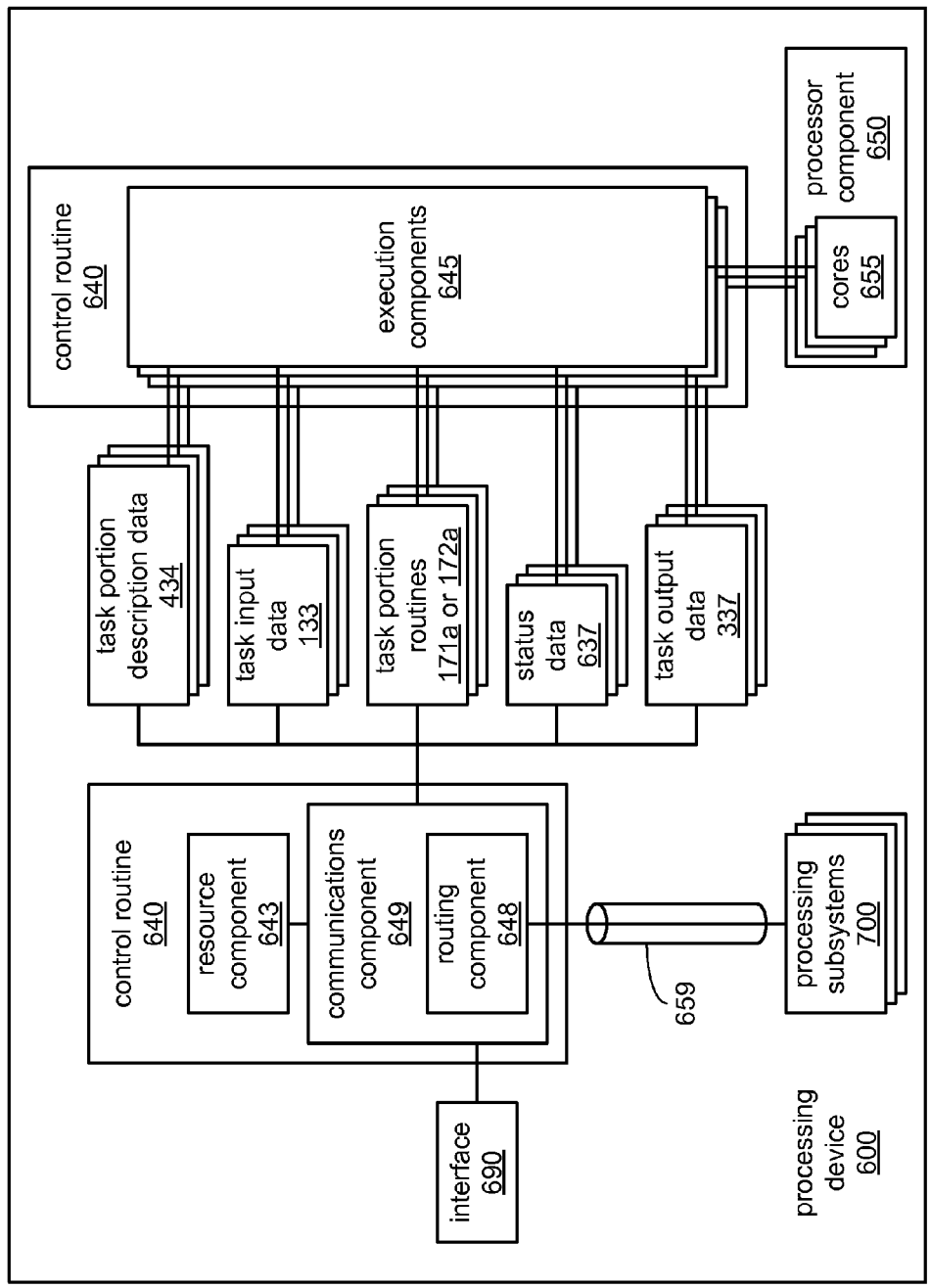
Figure 6:
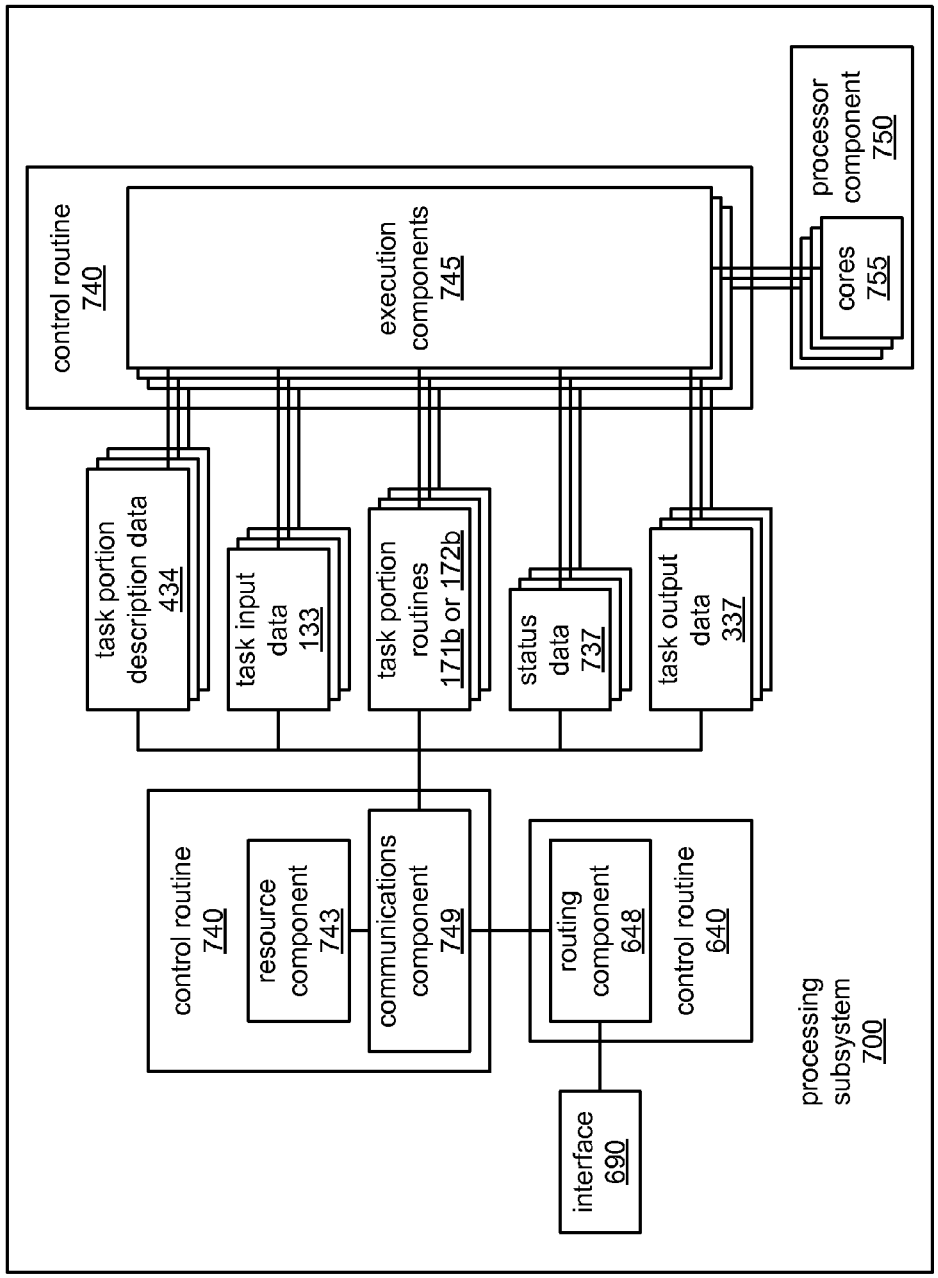

FIGS. 3, 4, 5 and 6 each illustrate a block diagram of a portion of an embodiment of the distributed processing system 1000 of FIG. 1 or 2A-B in greater detail. More specifically, FIG. 3 depicts aspects of the operating environment of the submission device 100 in which the processor component 150, in executing the control routine 140, submits a task associated with the task code 110 to the distributed processing system 1000 to be performed. FIG. 4 depicts aspects of the operating environment of the scheduling server 400 in which the processor component 450, in executing the control routine 440, selects ones of the cores 655 and/or 755 available within the processing devices 600 of the distributed processing system 1000 for assignment of task portions of the task. FIG. 5 depicts aspects of the operating environment of one of the processing devices 600 in which one or more cores 655 of the processor component 650, in executing the control routine 640, execute one or more task portion routines corresponding to one or more task portions assigned to them. FIG. 6 similarly depicts aspects of the operating environment of one of the processing subsystems 700 in which one or more cores 755 of the processor component 750, in executing the control routine 740, execute one or more task portion routines corresponding to one or more task portions assigned to them.

As recognizable to those skilled in the art, the control routines 140, 440, 640 and 740, including the components of which each is composed, are selected to be operative on whatever type of processor or processors that are selected to implement applicable ones of the processor components 150, 450, 650 or 750. In various embodiments, each of the control routines 140, 440, 640 and 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 450, 650 or 750. Where one or more device drivers are included, those device drivers may provide support for any of a variety of other components, whether hardware or software components, of corresponding ones of the computing devices 100, 400 or 600, or of the processing subsystem 700.

Each of the control routines 140, 440 or 640 may include a communications component 149, 449 or 649 executable by the processor component 150, 450 or 650 to operate the interface 190, 490 or 690, respectively, to transmit and receive signals via the network 999 as has been described. Among the signals received may be signals conveying the task input data 133, the task description data 134, the task configuration data 135, the task output data 337, one or more of the task portion routines 171*a-b* and/or 172*a-b*, pieces of resource data and/or pieces of status data among one or more of the computing devices 100, 400 and/or 600 via the network 999. As will be recognized by those skilled in the art, these communications components are selected to be operable with whatever type of interface technology is selected to implement corresponding ones of the interfaces 190, 490 and 690. Correspondingly, the control routine 740 may also include a communications component 749 executable by the processor component 750 to also exchange such data and routines via the network 999. However, as will shortly be explained, the communications component 749 must cooperate with one or more components of the control routine 640 to employ the interface 690 to engage in such exchanges.

Turning more specifically to FIG. 3, the control routine 140 may include compilers 141*a* and 141*b* executable by the processor component 150 to compile the task portion codes 111 and 112 of the task code 110 into compiled versions for execution by processor component cores of different types of processor component. Again, it should be noted that since only two types of processor component (e.g., the processor components 650 and 750) are depicted among the processing devices 600 of the distributed processing system 1000, only two compilers 141*a* and 141*b* are depicted. However, embodiments are possible in which the processing devices 600 have only one type of processor component, and embodiments are possible in which at least some of the processing devices 600 have more than two types of processor component. Further, embodiments are possible in which one or more types of processor component incorporate more than one type of processor component core. Thus, in such other embodiments, the control routine 140 may incorporate differing quantities of compilers as needed to generate compiled versions of task portion routines for execution by different types of core present among the processor components of the distributed processing system 1000.

Given that the depicted version of the task code 110 incorporates just the two task portion codes 111 and 112 (corresponding to just two distinct task portions), the compiler 141*a* compiles the task portion codes 111 and 112 to generate the task portion routines 171*a* and 172*a*, respectively, for execution by ones of the processor cores 655. Also, the compiler 141*b* compiles the same two task portion codes 111 and 112 to generate the task portion routines 171*b* and 172*b*, respectively, for execution by the ones of the processor cores 755. In this way, instances of each of the two task portions associated with each of the task portion codes 111 and 112 may be performed by either of the cores 655 or 755. To perform the task portion associated with the task portion code 111, the core 655 would execute the task portion routine 171*a*, and/or the core 755 would execute the task portion routine 171*b*. Correspondingly, to perform the task portion associated with the task portion code 112, the core 655 would execute the task portion routine 172*a*, and/or the core 755 would execute the task portion routine 172*b*.

The control routine 140 may include a submission component 144 executable by the processor component 150 to submit the task for performance by the distributed processing system 1000 by transmitting (in cooperation with the communications component 149) data and/or routines to the storage server 300 and/or the scheduling server 400. Specifically, the submission component 144 provides the task portion routines 171*a-b* and 172*a-b*, along with the task input data 133 (if present), to the storage server 300. Further, the submission component 144 provides the task description data 134 to the scheduling server 400, along with the task configuration data 135 (if present). The submission component 144 may monitor the controls 120 and submit the task in response to an indication of operation of the controls 120 by an operator of the submission device 100 to provide a command to do so. Alternatively or additionally, the submission component 144 may visually present indications of progress and/or completion of such a submission on the display 180.

The control routine 140 may include a status component 147 executable by the processor component 150 to transmit (in cooperation with the communications component 149) queries to the scheduling server 300 for indications of a current status of the performance of the task. The status component 147 may monitor the controls 120 and send such a query in response to an indication of operation of the controls 120 by an operator of the submission device 100 to provide a command to do so. Alternatively or additionally, upon receipt of an indication of a current status of the performance of the task from the scheduling server 400, the status component 147 may visually present such an indication of that status on the display 180.

Turning more specifically to FIG. 4, the control routine 440 may include a resource component 443 executable by the processor component 450 to receive (in cooperation with the communications component 449) resource data from each of the processing devices 600. As previously explained, pieces of resource data may be received from individual processing devices 600 and detail resources associated with all processor components therein. However, as also previously explained, pieces of resource data may be received from individual processor components 650 and/or 750 of each of the processing devices 600, and individually detail resources associated with each of those processor components. Again, such resources may include, and are not limited to, quantity and/or types of cores of each processor component, size of caches, speeds of cores, rates of power consumption of cores, size of storages available to processor components, etc. The resource component 443 may aggregate the received pieces of resource data into the resource data 430.

The control routine 440 may include a submission component 444 executable by the processor component 450 to receive (in cooperation with the communications component 449) one or both of the task description data 134 and the task configuration data 135 as part of the submission device 100 acting to submit the task associated with the task code 110 to be performed. As previously discussed, the task description data 134 provides indications of parameters of the task, including the quantity of instances of each task portion to be performed, location(s) at which task portion routines and/or input data are located, and/or a location at which any output data is to be stored. As also previously discussed, the task configuration data 135 (if received) may provide indications of the manner in which cores are to be selected for assignment of task portions, and those indications may override those of the default configuration data 435 (if present).

The control routine 440 may include a core selection component 445 executable by the processor component 450 to select processor component cores (e.g., one or more of the cores 655 and/or 755) of the distributed processing system 1000 for assignment of task portions to perform. As has been discussed, the processor component cores may be selected in a manner conforming to a selected trade-off between reducing the time required to perform a task and reducing an amount of electric power consumed to perform the task. In other words, selection of cores to execute instances of task portion routines assigned to them may be based on a selected balance point between compute time and power consumption time needed to execute the instances of the task routines. The default configuration data 435 (if present) may indicate a default selection to favor one of reducing time or reducing power consumption over the other. Further, the task submission of the task may include the transmitting of the task configuration data 135 to the scheduling server 400, where the task configuration data 135 includes an indication of a selection to favor one of reducing time or reducing power consumption that may differ from and override the selection indicated in the default configuration data 435.

As previously discussed, in embodiments in which the selection is made to favor reducing time to perform the task over reducing consumption of electric power to perform the task, ones of the cores 655 and/or 755 are selected based on a determination of which cores are able to perform each task portion more quickly. Considerations for which of the cores 655 and/or 755 are able to perform a task portion faster include, and are not limited to, clock frequency of each core, size of cache(s) available to each core, and an analysis of the likely performance of each task portion on each type of core. Alternatively or additionally, ones of the cores 655 and/or 755 are selected to increase the degree of locality among the selected cores so as to reduce the time to perform the task by reducing the amount of inter-process communication that must occur through the network 999 versus through internal buses within the processing devices 600. Again, it is expected that buses coupling cores within the processing devices 600 and within each of the processor components 650 and 750, themselves, are able to convey data at a higher rate than is possible via the network 999.

As previously discussed, in embodiments in which the selection is made to favor reducing consumption of electric power to perform the task over reducing time required to perform the task, ones of the cores 655 and/or 755 are selected based on their relatively rates of power consumption. Among ones of the cores 655 and/or 755 with relatively similar rates of power consumption, a determination may be made as to which are able to perform a given one of the task portions more quickly than the other such that less time will be required to perform that task portion at that relatively similar rate of power consumption among those cores to reduce overall power consumption. Alternatively or additionally, the task portions of the task may be analyzed to determine which will take longer to perform, and those task portions may be assigned to the ones of the cores 655 and/or 755 with lower rates of power consumption to cause more of the task to be performed by the cores that consume power at a lower rate. In contrast to where cores are selected in a manner favoring reducing the time to perform the task, cores may be selected without regard to their locality in selecting cores to reduce power consumption. This may be based on an assumption that inter-process communications are made up mostly of relatively brief exchanges of signals such that the difference in power consumption between transmitting those signals within one of the processing devices 600 versus between processing devices 600 is deemed relatively negligible.

The control routine 440 may include a status component 447 executable by the processor component 450 to receive (in cooperation with the communications component 449) pieces of status data indicative of current status of performance of task portions. As previously explained, pieces of status data may be received from individual processor component cores 655 and/or 755, and detail the current state of execution of corresponding ones of the task portion routines 171*a-b* and 172*a-b*. The processor component cores 655 and/or 755 may provide such status data to the scheduling server 400 without being prompted by queries from the scheduling server 400 to do so, such that the processor component cores 655 and/or 755 can be said to "push" their status data. The status component 447 may aggregate the received pieces of resource data into the status resource data 437. Further, the status component 447 may respond to the receipt of a query from the submission device 100 (received in cooperation with the communications component 449) via the network 999 by transmitting at least a portion of the status data 437 to the submission device 100 to convey an indication of the current status of performing the task thereto.

Turning more specifically to FIG. 5, the control routine 640 of one of the processing devices 600 may include a routing component 648 to operate the interface 690 to couple the processor component(s) 750 of the one or more processing subsystems 700 to the network 999 along with the processor component 650. As depicted, the routing component 648 may make up a portion of the communications component 649. As previously discussed, in some embodiments, the processor component 650 may be a base processor component of one of the processing devices 600, and as such, may be more directly coupled to the interface 690 than other processor components such that the processor component 650 is able to directly operate the interface 690. In contrast, in such embodiments, the processor component 750 may be a subsystem processor component incorporated into a processing subsystem 700 also incorporating the storage 760 and/or other resources that are entirely separate and independent of the storage 660 and/or other resources associated with the processor component 650. More specifically, each of the processing subsystems 700 may be implemented as one or more add-in circuitboards that are coupled to one or more buses 659 by which such add-in circuitboards are typically coupled to the processor component 650 and/or supporting circuits of the processor component 650.

The routing component 648 may operate the interface 690 to provide each of the processing subsystems 700 a separate Internet protocol (IP) address on the network 999 in addition to whatever IP address may be provided to processor component 650 as the base processor component that directly operates the interface 690. In essence, each of the processing subsystems 700 are given a "virtual presence" on the network 999 with the cooperation of the processor component 650, despite none of the processor components 750 of the processing subsystems 700 being able to directly access the interface 690. As IP packets are received from the network 999 that are directed to the IP address associated with the processor component 650, the communications component 649 simply accepts those IP packets and un-encapsulates their contents to enable the processor component 650 to work with those contents. However, as IP packets are received from the network 999 that are directed to an IP address associated with one of the processing subsystems 700, the routing component 648 relays those IP packets to appropriate ones of the processing subsystems 700 with little or no change. Within each of the processing subsystems 700, the communications component 749 un-encapsulates the IP packets routed to it by the routing component 648 to enable its corresponding processor component 750 to work with the contents thereof.

The control routine 640 of one of the processing devices 600 may include a resource component 643 executable by the processor component 650 to transmit (in cooperation with the communications component 449) resource data to the scheduling server 400. In some embodiments, the resource component may perform one or more tests of the processor component 650 and/or the processing device 600 to dynamically determine what processing and/or other resources are available. This may be done in embodiments in which those resources may be altered from time to time.

The control routine 640 of one of the processing devices 600 may include multiple instances of an execution component 645 separately executable by separate cores 655 of the processor component 650 to perform an assigned task portion by enabling execution of one of various task portion routines (e.g., one of the task portion routines 171a or 172a). Each instance of the execution component 645 may include at least a separately executable portion of an operating system, one or more libraries of library functions and/or device drivers. As the scheduling server 400 transmits indications to each of the cores 655 of having been selected to perform task portion, such indications may be received as individual instances of a task portion description data 434.

For each of the cores 655, its corresponding instance of the task portion description data 434 may indicate the particular one of the task portion routines 171a or 172a to be executed and where to retrieve a copy thereof. Each instance of the task portion description data 434 may also indicate where to retrieve at least a corresponding portion of the task input data 133 (if present) and/or where to store the task output data 337 (if there is to be any). Each instance of the task portion description data 434 may also indicate where to transmit instances of status data 637 indicating current status of progress in executing an instance of a task portion routine.

More specifically, in executing its corresponding instance of the execution component 645, a core 655 awaits receipt of an instance of the task portion description data 434. Upon receiving an instance of the task portion description data 434, the core 655 retrieves an appropriate one of the task portion routines 171a or 172a from the storage server 300, along with the task input data 133, as indicated in the task portion description data 434. Further execution of the instance of the execution component 645 causes the core 655 to commence execution of its associated instance of one of the task portion routines 171a or 172a (e.g., causes the core 655 to "jump" to an instruction of that instance of a task portion routine). During execution of the instance of either the task portion routine 171a or 172a, either instructions of the one of the task portion routines 171a or 172a or instructions of the instance of the execution component 645 causes the core 655 to transmit the status data 637 (in cooperation with the communications component 649) to the scheduling server 400. Also during execution of the instance of either the task portion routine 171a or 172a, the core 655 is caused to transmit the task output data 337 (if there is to be any) to the storage server 300 (again, in cooperation with the communications component 649). Upon completion of execution of the task portion routine 171a or 172a, the core 655 is caused by execution of the execution component 645 to again await receipt of a new instance of the task portion description data 434 indicating aspects of the next task portion to perform.

Turning more specifically to FIG. 6, the control routine 740 of one of the processing subsystems 700 may include components substantially corresponding to the components of the control routine 640 performing substantially the same functions. Specifically, the control routine 740 may include, in addition to the communications component 749 (as previously discussed), a resource component 743 and multiple instances of an execution component 745 for separate execution by each of the cores 755.

Figure 7:
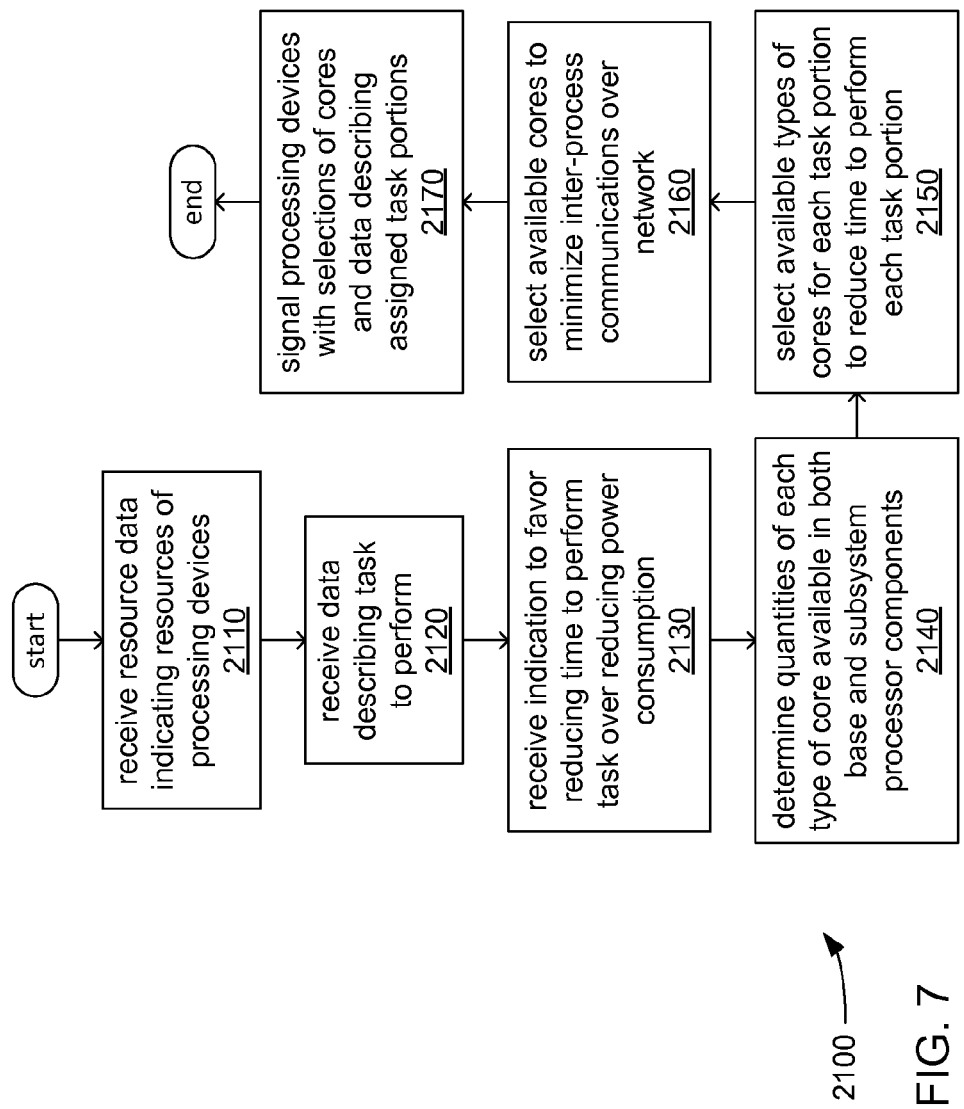
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 450 in executing at least the control routine 440, and/or performed by other component(s) of the scheduling server 400.

At 2110, a processor component of a scheduling server of a distributed processing system (e.g., the processor component 450 of the scheduling server 400 of the distributed processing system 1000) receives resource data from various processing devices of the distributed processing system (e.g., the processing devices 600). As previously discussed, the resource data indicates processing and/or other resources associated with each processor component within each of the processing devices (e.g., each of the base processor components 650 and/or the subsystem processing components 750). As also previously discussed, such resource data may be received per processing device or per processor component.

At 2120, data describing a task to be performed by the processing devices of the distributed processing system is received (e.g., the task description data 134). As previously discussed, such task description data specifies various parameters of the task to be performed, including and not limited to, quantity of different task portions to perform, quantity of instances of each task portion to perform, locations where task portion routines and/or input data (if any) may be found, a location where any status data is to be transmitted to, and/or a location where any output data is to be stored.

At 2130, an indication is received to select processor cores for assignment of task portions of the task in a manner that favors reducing time to perform the task over reducing consumption of electric power in performing the task. More specifically, selections of cores to reduce electric power consumption are made only if the choice to do so does not increase the amount of time to perform the task, or increases the time to perform the task by a relatively negligible degree. As previously discussed, the processor component of the scheduling server may receive such an indication from a configuration data (e.g., the default configuration data 435 already stored in the storage 460 or the task configuration data 135 received from the submission device 100).

At 2140, in response to such indication, quantities of each type of core currently available from each base processor component (e.g., one of the processor components 650) and each subsystem processor component (e.g., one of the processor components 750) of each of the processing devices are determined. As previously discussed, one or more cores of either the base or subsystem processor components in one or more of the processing devices may still be engaged in executing a task portion routine implementing logic of a task portion of another task, and may therefore not yet be available to assign to a task portion of a new task.

At 2150, available types of processor cores for each of the task portions of task are selected so as to reduce the time required to perform each task portion. Stated differently, for each task portion to be performed, each of the available different types of core are evaluated to determine which is able to perform the task portion more quickly. Then, if possible (e.g., if sufficient cores of whatever type performs more quickly are available), cores of the type able to perform a task portion more quickly are selected to perform instances of that task portion.

At 2160, in selecting from among the available cores, the selection of cores is also made to minimize the occurrences of inter-process communications over the network that couples the processing devices (e.g., the network 999). Stated differently, the cores are selected so as to increase the degree of locality among the selected cores such that more of the selected cores are physically located within fewer separate processing devices. As previously discussed, it is envisioned that inter-process communications occurring between cores across buses and/or within processor components within each processing device are able to be carried out more quickly than inter-process communications across a network between processing devices.

At 2170, the processing devices having cores that are selected to be assigned to perform a task portion of the task are signaled with indications of those selections. As previously discussed, the cores selected in each of the processing devices having cores that are so selected may be cores of a base processor component, or cores of a subsystem processor component, or both. As also previously discussed, such indications may be provided by transmitting a task portion description data to each selected core to thereby provide each core with information needed to retrieve a corresponding task portion routine and/or any task input data, etc.

Figure 8:
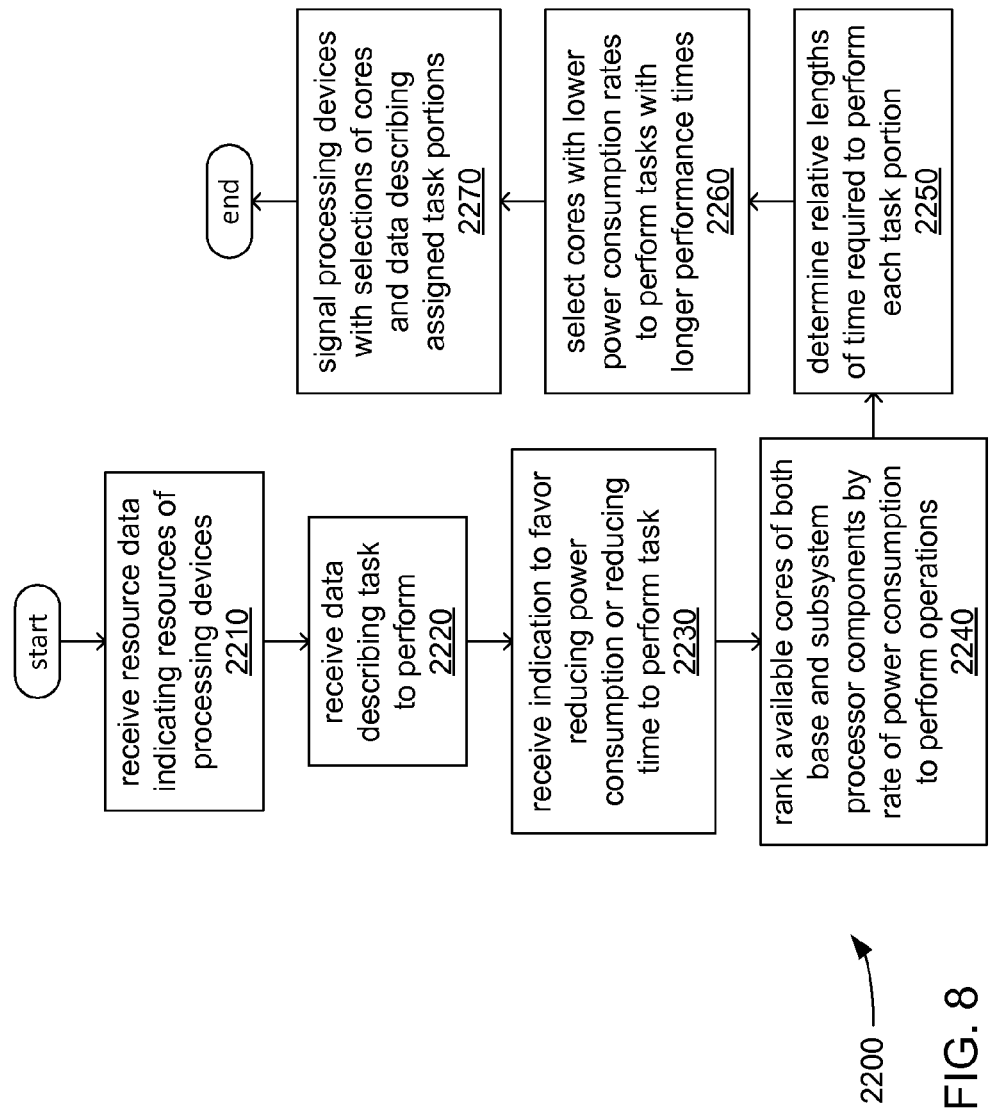

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 450 in executing at least the control routine 440, and/or performed by other component(s) of the scheduling server 400.

At 2210, a processor component of a scheduling server of a distributed processing system (e.g., the processor component 450 of the scheduling server 400 of the distributed processing system 1000) receives resource data from various processing devices of the distributed processing system (e.g., the processing devices 600). At 2220, data describing a task to be performed by the processing devices of the distributed processing system is also received (e.g., the task description data 134).

At 2230, an indication is received to select processor cores for assignment of task portions of the task in a manner that favors reducing the consumption of electric power to perform the task over reducing the time required to perform the task. More specifically, selections of cores to reduce time required are made only if the choice to do so does not increase the amount of electric power consumed to perform the task, or increases consumption of electric power to perform the task by a relatively negligible degree. As previously discussed, the processor component of the scheduling server may receive such an indication from a configuration data (e.g., the default configuration data 435 already stored in the storage 460 or the task configuration data 135 received from the submission device 100).

At 2240, the cores of the base processor components (e.g., the cores 655 of the processor components 650) and the subsystem processor components (e.g., the cores 755 of the processor components 750) that are currently available are ranked by their relative rates of power consumption to identify those with lower rates of power consumption. At 2250, the relative lengths of time required to perform each task portion is analyzed to identify the task portions that will require more time to perform.

At 2260, the task portions requiring more time to perform are assigned to the cores with the lowest rates of power consumption. As previously discussed, this effectively results in more of the task, overall, being assigned to the cores with the lowest rates of power consumption to thereby reduce overall power consumption. At 2270, the processing devices having cores that are selected to be assigned to perform a task portion of the task are signaled with indications of those selections.

Figure 9:
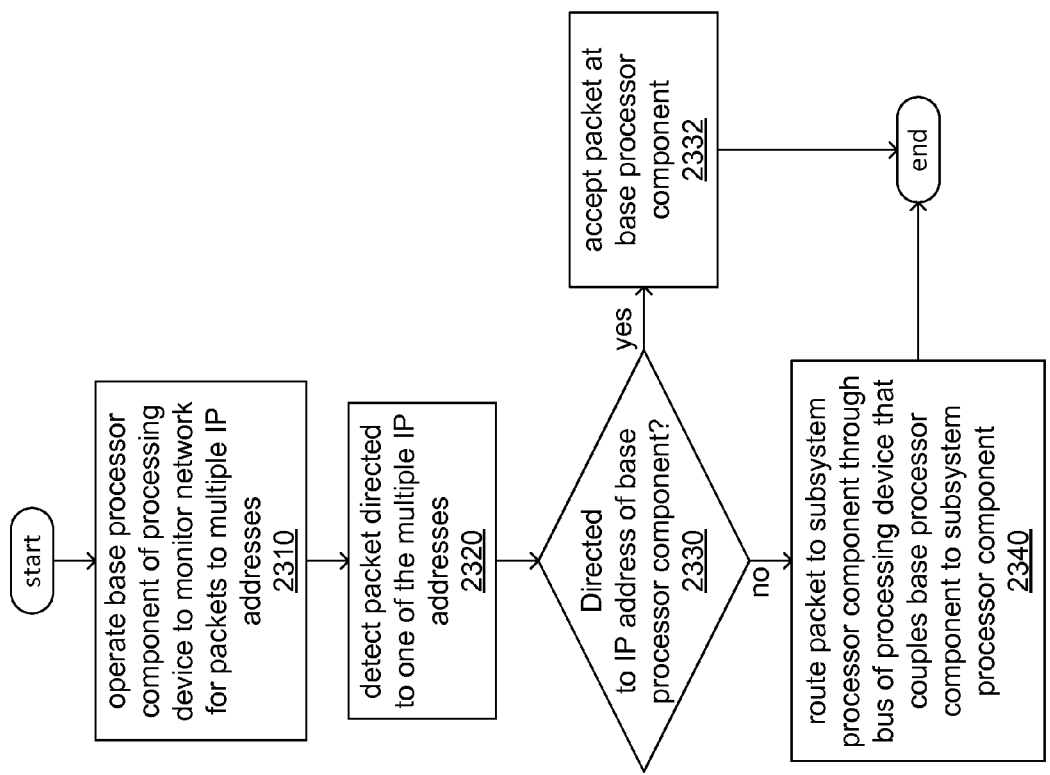

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 650 in executing at least the control routine 640, and/or performed by other component(s) of at least one of the processing devices 600.

At 2310, a base processor component of a processing device of a distributed processing system (e.g., one of the processor components 650 of one of the processing devices 600 of the distributed processing system 1000) operates an interface of the processing device to a network (e.g., the interface 690 coupling one of the processing devices 600 to the network 999) to monitor the network for packets directed towards a multiple IP addresses associated with processor components of the processing device. As previously discussed, a processor component 650 serving as the base processor component of one of the processing devices 600 may operate the interface 690 of that processing device 600 to provide "virtual presences" for each of the processor components 750 serving as a subsystem processor component. Thus, multiple IP addresses may be associated with the one processing device 600. At 2320, a packet is detected on the network that is directed towards one of the IP addresses.

At 2330, a check is made as to whether the packet is directed to the IP address of the base processor component. If so, then the packet is accepted (and subsequently acted upon) by the base processor component. However, if the packet is not directed to the IP address of the base processor component, then the packet is routed at 2340 to whichever one of the subsystem processor components has been provided an IP address on the network that corresponds to the IP address to which the packet is directed. This routing of the packet is through one or more buses (e.g., the bus 659) that couples the subsystem processor component to the base processor component.

Figure 10:
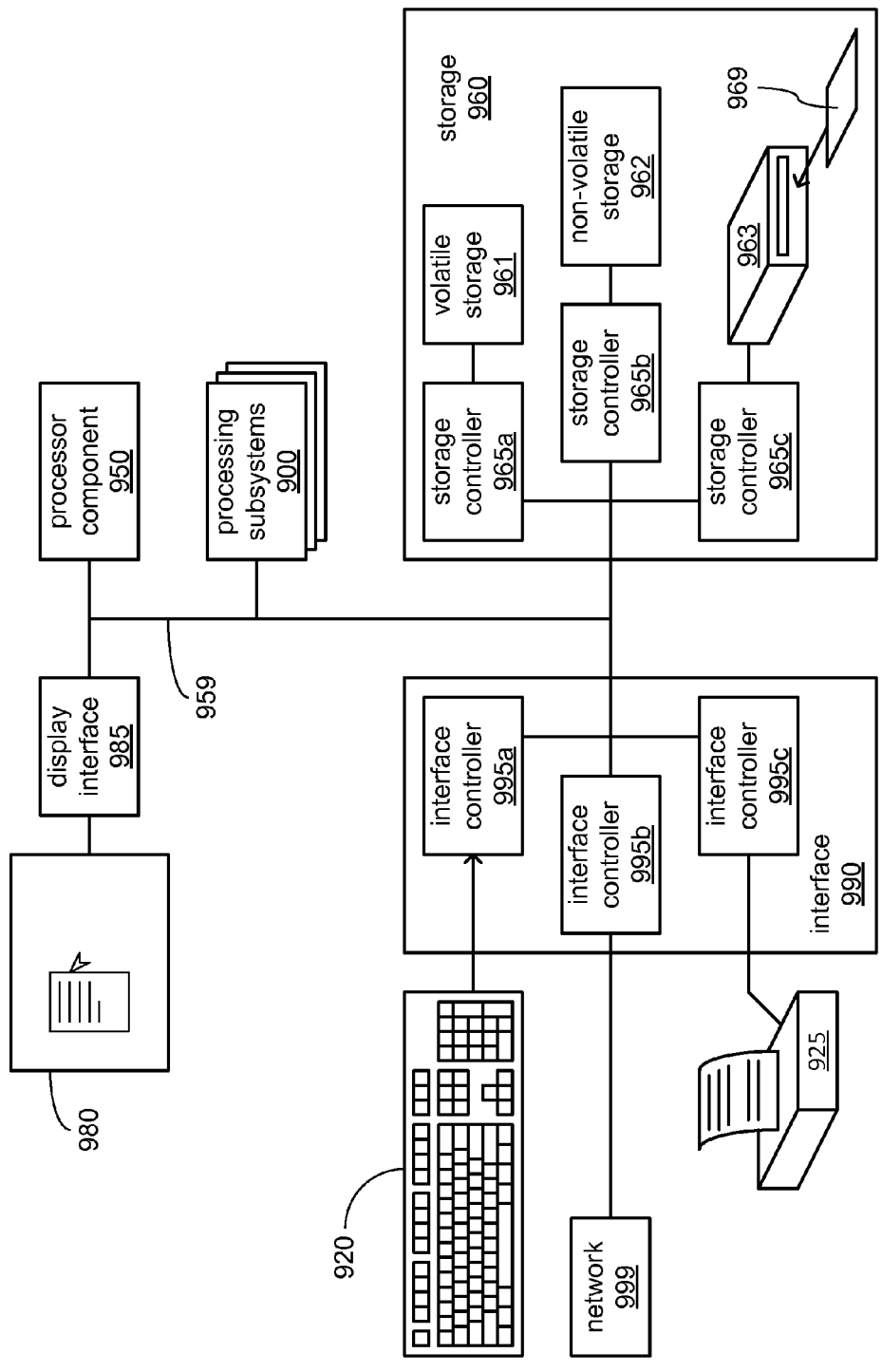
FIG. 10 illustrates a processing architecture according to an embodiment.

FIG. 10 illustrates an embodiment of a processing architecture 3000 suitable for implementing various embodiments as previously described. More specifically, the processing architecture 3000 (or variants thereof) may be implemented as part of one or more of the computing devices 100, 400 or 600, and/or by the processing subsystem 700. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985, or one or more processing subsystems 900.

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150, 450, 650 or 750) may include any of a wide variety of commercially available processors, employing any of a wide variety of technologies and implemented with one or more cores physically combined in any of a number of ways.

As previously discussed, the storage 960 (corresponding to one or more of the storages 160, 460, 660 or 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to one or more of the interfaces 190, 490, 690 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to one or more of the displays 180 and 380), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The detailed disclosure now turns to providing examples that pertain to further embodiments. The examples provided below are not intended to be limiting.

In some examples, an apparatus to assign processor component cores to perform task portions may include a processor component; an interface to couple the processor component to a network to receive data that indicates available cores of base and subsystem processor components of processing devices of a distributed processing system, the subsystem processor components made accessible on the network through the base processor components; and a core selection component for execution by the processor component to select cores from among the available cores to execute instances of task portion routines of a task based on a selected balance between compute time and power consumption needed to execute the instances of the task portion routines.

Additionally or alternatively, the apparatus may include a resource component for execution by the processor component to receive resource data that indicates a quantity of cores present in at least one base processor component and a quantity of cores present in at least one subsystem processor component of a processing device of the distributed processing system.

Additionally or alternatively, the resource data may include an indication of an amount of storage associated with the at least one base processor component and an amount of storage associated with the at least one subsystem processor component.

Additionally or alternatively, the apparatus may include a status component for execution by the processor component to receive a status data that indicates a subset of the quantity of cores present in the at least one base processor component that are available for assignment of a task portion and indicates a subset of the quantity of cores present in the at least one subsystem processor component that are available for assignment of a task portion.

Additionally or alternatively, the apparatus may include a status component for execution by the processor component to receive a first status data that indicates a current status of execution of an instance of a task portion routine of the task by one of the selected cores.

Additionally or alternatively, the status component may receive a query from a submission device for a current status of performance of the task and may transmit a second status data that indicates the current status of performance of the task based on a current status of execution of the instances of the task portion routines by the selected cores.

Additionally or alternatively, the core selection component may determine relative periods of time required to perform each task portion of the task, and may select a type of core from among types of cores included in the available cores to perform each task portion based on the relative periods of time.

Additionally or alternatively, the core selection component may select the selected cores from among the available cores to assign to perform instances of a task portion that requires a relatively long period of time to perform in response to the selected trade-off comprising favoring reducing the electric power consumed over reducing the time required.

Additionally or alternatively, the core selection component may select the selected cores from among the available cores to increase a degree of locality among the selected cores to minimize inter-process communications between ones of the processing devices in response to the selected trade-off comprising favoring reducing the time required over reducing the electric power consumed.

Additionally or alternatively, the core selection component may transmit indications of the selection of the selected cores via the interface to the selected cores.

In some examples, an apparatus to execute task portion routines may include a base processor component; an interface to couple the base processor component to a network; a subsystem processor component; a bus to communicatively couple the subsystem processor component to the base processor component; and a routing component for execution by the base processor component to receive a packet from the network, to determine the Internet protocol (IP) address to which the packet is directed, and to route the packet to the subsystem processor component via the bus based on the IP address.

Additionally or alternatively, the apparatus may include a first resource component for execution by the base processor component to transmit a first resource data that indicates a quantity of cores present in the base processor in a first packet on the network, the first packet indicating a first IP address associated with the base processor as its source; and a second resource component for execution by the subsystem processor component to transmit a second resource data that indicates a quantity of cores present in the subsystem processor in a second packet to the routing component via the bus, the routing component to transmit the second packet on the network, the second packet indicating a second IP address associated with the subsystem processor as its source.

Additionally or alternatively, the apparatus may include a first communications component for execution by the base processor component to present the base processor component on the network at a first IP address to enable the base processor component to receive packets directed to the first IP address, and to accept the packet at the base processor component based on the IP address to which the packet is directed comprising the first IP address; and a second communications component for execution by the subsystem processor component to accept the packet at the subsystem processor component based on the IP address to which the packet is directed comprising a second IP address, the routing component to present the subsystem processor component on the network at the second IP address to enable the subsystem processor component to receive packets direct to the second IP address.

Additionally or alternatively, the apparatus may include a first execution component for execution by the base processor component to execute a first task portion routine received from the network in at least one packet directed to the first IP address; and a second execution component for execution by the subsystem processor component to execute a second task portion routine received from the network in at least one packet directed to the second IP address.

Additionally or alternatively, the first execution component may transmit a first status data indicating status of execution of the first task portion to a scheduling server via the network in a packet indicating the first IP address as a source.

Additionally or alternatively, the second execution component may transmit a second status data indicating status of execution of the second task portion to the routing component, and the routing component to transmit the second status data indicating status of execution of the second task portion to the scheduling server via the network in a packet indicating the second IP address as a source.

In some examples, a computer-implemented method for assigning processor component cores to perform task portions may include receiving status data indicating available cores of base and subsystem processor components of processing devices of a distributed processing system, the subsystem processor components made accessible on the network through the base processor components; selecting cores from among the available cores to execute instances of task portion routines of a task based on a selected trade-off between reducing time required and reducing electric power consumed to execute the instances of the task portion routines; and transmitting indications of the selection of the selected cores via the interface to the selected cores.

Additionally or alternatively, the method may include receiving resource data indicating resources associated with each base processor component and each subsystem processor component of each processing device of the distributed processing system.

Additionally or alternatively, the resources associated with each base processor component and each subsystem processor component may include one of a quantity of cores present in at least one base processor component or in at least one subsystem processor component, a size of a cache of a core of a base processor component or a subsystem processor component, or an amount of storage associated with a base processor component or a subsystem processor component.

Additionally or alternatively, the method may include receiving a status data that indicates a subset of the quantity of cores present in the at least one base processor component or the at least one subsystem processor component that are available for assignment of a task portion.

Additionally or alternatively, the method may include receiving a first status data that indicates a current status of execution of an instance of a task portion routine of the task by one of the selected cores, receiving a query from a submission device for a current status of performance of the task, and transmitting via the interface a second status data that indicates the current status of performance of the task based on a current status of execution of the instances of the task portion routines by the selected cores.

Additionally or alternatively, the method may include determining relative periods of time required to perform each task portion of the task, and selecting a type of core from among types of cores included in the available cores to perform each task portion based on the relative periods of time.

Additionally or alternatively, the method may include selecting the selected cores from among the available cores to assign to perform instances of a task portion that requires a relatively long period of time to perform in response to the selected trade-off comprising favoring reducing the electric power consumed over reducing the time required.

Additionally or alternatively, the method may include selecting the selected cores from among the available cores to increase a degree of locality among the selected cores to minimize inter-process communications between ones of the processing devices in response to the selected trade-off comprising favoring reducing the time required over reducing the electric power consumed.

In some examples, at least one machine-readable storage medium may include instructions that when executed by a computing device, cause the computing device to receive status data indicating available cores of base and subsystem processor components of processing devices of a distributed processing system, the subsystem processor components made accessible on the network through the base processor components; select cores from among the available cores to execute instances of task portion routines of a task based on a selected trade-off between reducing time required and reducing electric power consumed to execute the instances of the task portion routines; and transmit indications of the selection of the selected cores via the interface to the selected cores.

Additionally or alternatively, the computing device may be caused to receive resource data indicating resources associated with each base processor component and each subsystem processor component of each processing device of the distributed processing system.

Additionally or alternatively, the resources associated with each base processor component and each subsystem processor component may include one of a quantity of cores present in at least one base processor component or in at least one subsystem processor component, a size of a cache of a core of a base processor component or a subsystem processor component, or an amount of storage associated with a base processor component or a subsystem processor component.

Additionally or alternatively, the computing device may be caused to receive a status data that indicates a subset of the quantity of cores present in the at least one base processor component or the at least one subsystem processor component that are available for assignment of a task portion.

Additionally or alternatively, the computing device may be caused to receive a first status data that indicates a current status of execution of an instance of a task portion routine of the task by one of the selected cores, receive a query from a submission device for a current status of performance of the task, and transmit via the interface a second status data that indicates the current status of performance of the task based on a current status of execution of the instances of the task portion routines by the selected cores.

Additionally or alternatively, the computing device may be caused to determine relative periods of time required to perform each task portion of the task, and select a type of core from among types of cores included in the available cores to perform each task portion based on the relative periods of time.

Additionally or alternatively, the computing device may be caused to select the selected cores from among the available cores to assign to perform instances of a task portion that requires a relatively long period of time to perform in response to the selected trade-off comprising favoring reducing the electric power consumed over reducing the time required.

Additionally or alternatively, the computing device may be caused to select the selected cores from among the available cores to increase a degree of locality among the selected cores to minimize inter-process communications between ones of the processing devices in response to the selected trade-off comprising favoring reducing the time required over reducing the electric power consumed.

In some examples, at least one machine-readable storage medium may include instructions that when executed by a computing device, cause the computing device to perform any of the above.

In some examples, an apparatus to assign processor component cores to perform task portions may include means for performing any of the above.

The invention claimed is:

1. An apparatus to assign processor component cores to perform task portions comprising:
   a processor component;
   an interface to couple the processor component to a network to receive data that indicates available cores of base and subsystem processor components of processing devices of a distributed processing system, the subsystem processor components made accessible on the network through the base processor components, the available cores of the base and subsystem processor components of processing devices of the distributed processing system to include a plurality of types of cores with each type of core arranged to execute a different version of compiled code; and
   a core selection component for execution by the processor component to:
      select cores from among the available cores to execute instances of task portion routines of a task based on a selected balance between compute time and power consumption needed to execute the instances of the task portion routines; and
      transmit an indication of the selection to each of the selected cores via the interface, each indication to identify a location of a version of compiled code of the task portion routine corresponding to the type of core.

2. The apparatus of claim 1, comprising a resource component for execution by the processor component to receive resource data that indicates a quantity of cores present in at least one base processor component and a quantity of cores present in at least one subsystem processor component of a processing device of the distributed processing system.

3. The apparatus of claim 2, comprising a status component for execution by the processor component to receive a status data that indicates a subset of the quantity of cores present in the at least one base processor component that are available for assignment of a task portion and indicates a subset of the quantity of cores present in the at least one subsystem processor component that are available for assignment of a task portion.

4. The apparatus of claim 1, comprising a status component for execution by the processor component to receive a first status data that indicates a current status of execution of an instance of a task portion routine of the task by one of the selected cores.

5. The apparatus of claim 4, the status component to receive a query from a submission device for a current status of performance of the task and to transmit a second status data that indicates the current status of performance of the task based on a current status of execution of the instances of the task portion routines by the selected cores.

6. The apparatus of claim 1, the core selection component to determine relative periods of time required to perform each task portion of the task, and to select a type of core from among types of cores included in the available cores to perform each task portion based on the relative periods of time.

7. The apparatus of claim 6, the core selection component to select the selected cores from among the available cores to assign to perform instances of a task portion that requires a relatively long period of time to perform in response to the selected balance comprising favoring reducing the electric power consumed over reducing the time required.

8. The apparatus of claim 1, the core selection component to select the selected cores from among the available cores to increase a degree of locality among the selected cores to minimize inter-process communications between ones of the processing devices in response to the selected balance comprising favoring reducing the time required over reducing the electric power consumed.

9. A computing-implemented method for assigning processor component cores to perform task portions comprising:
receiving status data indicating available cores of base and subsystem processor components of processing devices of a distributed processing system, the subsystem processor components made accessible on a network through the base processor components, the available cores of the base and subsystem processor components of processing devices of the distributed processing system including a plurality of types of cores with each type of core arranged to execute a different version of compiled code;
selecting cores from among the available cores to execute instances of task portion routines of a task based on a selected trade-off between reducing time required and reducing electric power consumed to execute the instances of the task portion routines; and
transmitting an indication of the selection to each of the selected cores via an interface, each indication identifying a location of a version of compiled code of the task portion routine corresponding to the type of core.

10. The computer-implemented method of claim 9, comprising receiving resource data indicating resources associated with each base processor component and each subsystem processor component of each processing device of the distributed processing system.

11. The computer-implemented method of claim 10, the resources associated with each base processor component and each subsystem processor component comprising one of a quantity of cores present in at least one base processor component or in at least one subsystem processor component, a size of a cache of a core of a base processor component or a subsystem processor component, or an amount of storage associated with a base processor component or a subsystem processor component.

12. The computer-implemented method of claim 11, comprising receiving a status data that indicates a subset of the quantity of cores present in the at least one base processor component or the at least one subsystem processor component that are available for assignment of a task portion.

13. The computer-implemented method of claim 9, comprising:
determining relative periods of time required to perform each task portion of the task; and
selecting a type of core from among types of cores included in the available cores to perform each task portion based on the relative periods of time.

14. The computer-implemented method of claim 13, comprising selecting the selected cores from among the available cores to assign to perform instances of a task portion that requires a relatively long period of time to perform in response to the selected trade-off comprising favoring reducing the electric power consumed over reducing the time required.

15. The computer-implemented method of claim 9, comprising selecting the selected cores from among the available cores to increase a degree of locality among the selected cores to minimize inter-process communications between ones of the processing devices in response to the selected trade-off comprising favoring reducing the time required over reducing the electric power consumed.

16. At least one non-transitory machine-readable storage medium comprising instructions that when executed by a computing device, cause the computing device to:
receive status data indicating available cores of base and subsystem processor components of processing devices of a distributed processing system, the subsystem processor components made accessible on a network through the base processor components, the available cores of the base and subsystem processor components of processing devices of the distributed processing system to include a plurality of types of cores with each type of core arranged to execute a different version of compiled code;
select cores from among the available cores to execute instances of task portion routines of a task based on a selected trade-off between reducing time required and reducing electric power consumed to execute the instances of the task portion routines; and
transmit an indication of the selection to each of the selected cores via an interface, each indication to identify a location of a version of compiled code of the task portion routine corresponding to the type of core.

17. The at least one non-transitory machine-readable storage medium of claim 16, the computing device caused to:
receive a first status data that indicates a current status of execution of an instance of a task portion routine of the task by one of the selected cores;
receive a query from a submission device for a current status of performance of the task; and
transmit via the interface a second status data that indicates the current status of performance of the task based on a current status of execution of the instances of the task portion routines by the selected cores.

18. The at least one non-transitory machine-readable storage medium of claim 16, the computing device caused to:
determine relative periods of time required to perform each task portion of the task; and
select a type of core from among types of cores included in the available cores to perform each task portion based on the relative periods of time.

19. The at least one non-transitory machine-readable storage medium of claim 18, the computing device caused to select the selected cores from among the available cores to assign to perform instances of a task portion that requires a relatively long period of time to perform in response to the selected trade-off comprising favoring reducing the electric power consumed over reducing the time required.

20. The at least one non-transitory machine-readable storage medium of claim 16, the computing device caused to select the selected cores from among the available cores to increase a degree of locality among the selected cores to minimize inter-process communications between ones of the processing devices in response to the selected trade-off comprising favoring reducing the time required over reducing the electric power consumed.

* * * * *